Figure 1:
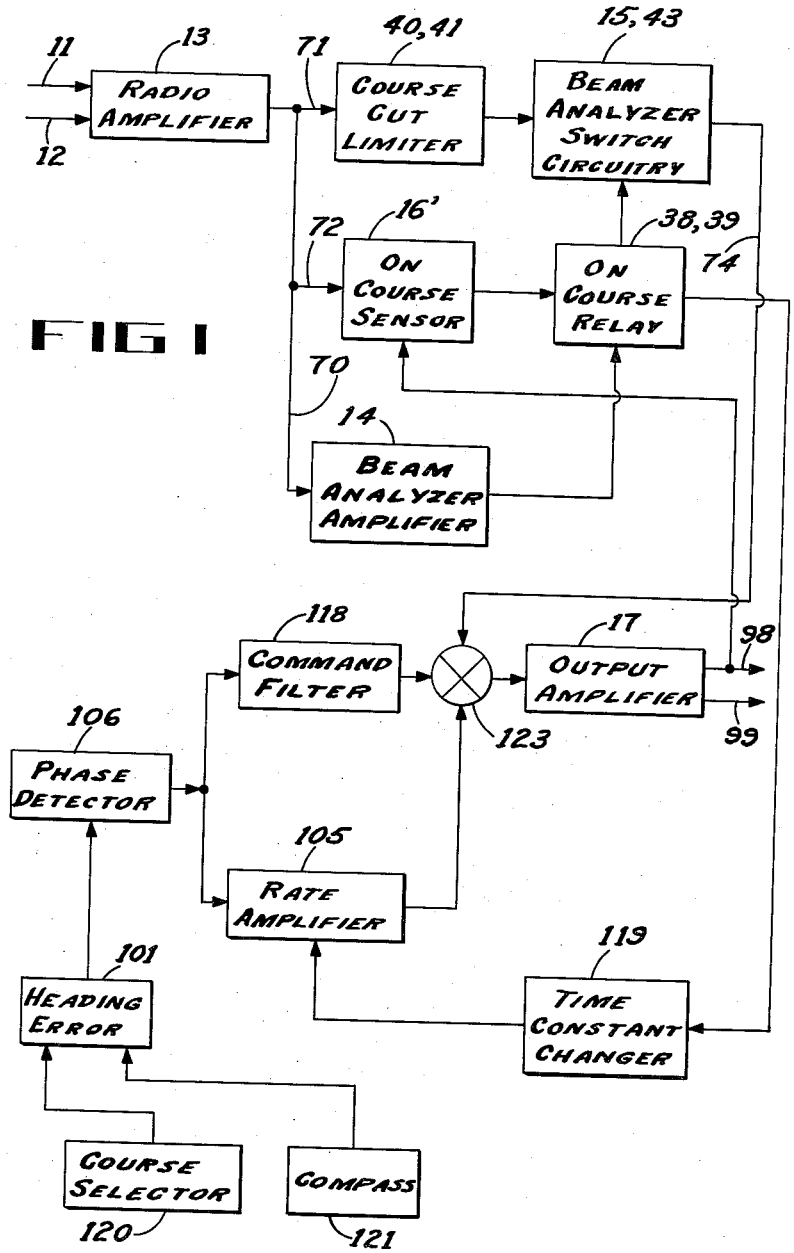

INVENTORS
MELVIN H. RHODES
HANS I. WALKER
BY
ATTORNEY
AGENT

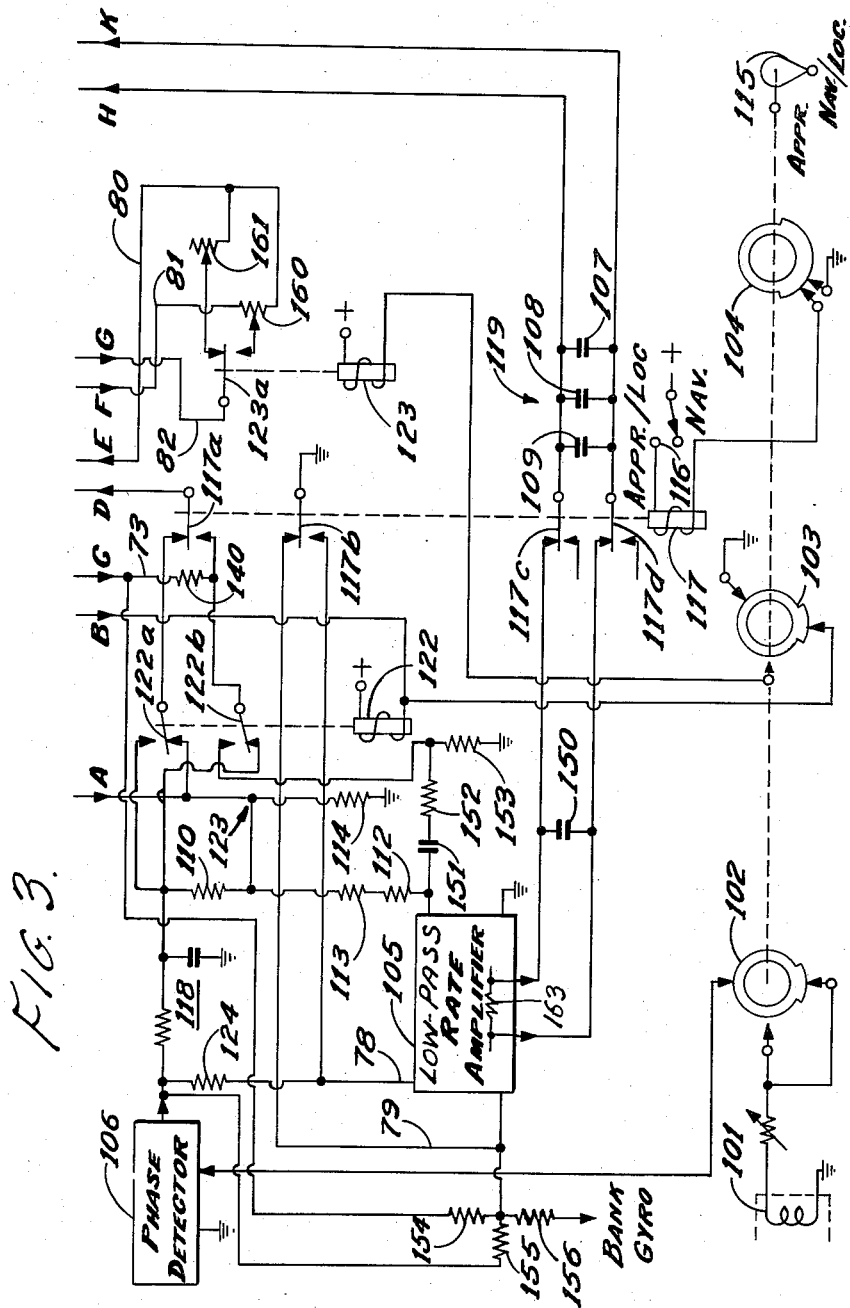

3,041,607
AIRCRAFT GUIDANCE SYSTEM
Melvin H. Rhodes, Kansas City, Mo., and Hans I. Walker, Cedar Rapids, Iowa, assignors to Collins Radio Company, Cedar Rapids, Iowa, a corporation of Iowa
Filed July 31, 1958, Ser. No. 752,340
11 Claims. (Cl. 343—107)

This invention relates to flight control systems and more particularly to improvements in certain of the lateral control and horizontal guidance functions of manual or automatic flight control systems.

A control system with which this invention is operative normally provides full control for an airplane. Included in the flight control system are two separate systems, the horizontal guidance system and the vertical guidance or longitudinal control system. Together these systems provide the entire flying directions to an aircraft from an automatic pilot or a manual system. Necessary to flight control systems are a plurality of command sources. These command sources normally furnish information to the flight control system concerning the position of the aircraft with respect to a radio signal, a magnetic heading, pitch and roll attitude, and altitude. Equipments or command sources which furnish this information include navigation receivers, glideslope receivers, magnetic compasses and gyroscopes. In an automatic flight control system, these command sources are selectively utilized when the pilot chooses a predetermined mode of automatic flight. The modes of automatic flight which are available in a typical automatic flight control system are the gyro mode, the heading mode, the navigational mode, and the approach mode. Sometimes the navigational mode is called the navigation-localizer mode. This mode is so named because the command signals may be the radio signals from an omnirage station, tacan, doppler, navigation computer, or from a localizer station.

This invention deals specifically with the horizontal guidance system described above. Although omnirange automatic flight control will be described, it is to be understood that the invention may be utilized elsewhere and is not to be limited to the particular embodiment described. Normally, variable omnirange radio courses are flown when an automatic pilot system is positioned in the navigation-localizer function. Course deviation signals are generated in a radio receiver from the variable omnirange radio signals and are combined with selected heading signal to form the bank command signal for the aircraft for one type of aircraft computing circuitry. This invention includes, in an automatic or manual flight control system, a novel and improved electrical on-course sensor means responsive to the variable omnirage signals and a novel cross-wind corrector means responsive to the heading error signals. The on-course sensor of this invention determines from the radio signal when the aircraft is on-course. When the aircraft is determined to be on-course from an analysis of the radio signals, the navigation mode is automatically switched to an on-course operational mode. An automatic pilot system incorporating this invention will remain in the on-course operation until a different mode of operation is selected by the pilot. In a typical system, the various modes of operation included in the horizontal and lateral guidance system and available for selection by the pilot are the gyro function, the heading function, and the navigation-localizer function as enumerated above. Horizontal guidance system functions which are not a part of this invention will not be described in detail herein.

In the typical automatic flight control system in which the incorporation of this invention will be illustrated, the normal aileron command signals are obtained by various algebraic summations of bank command, bank angle and bank rate signals. Normal rudder command signals are obtained by the algebraic summation of bank command and yaw rate signals. Coordination between the aileron and the rudder command signals is obtained in a well-known manner by feeding the ratio of the bank command and yaw rate signals through a filter and then applying these signals to the rudder servo.

The present invention includes the novel function computing circuits necessary to operate the rudder and aileron channel control circuits in an automatic pilot system. The input signals to this invention are a heading error signal and a radio deviation signal. The heading error signal is derived from magnetic compass signals and course indicator signals in a manner well known to a person skilled in the art. The heading error signal approximates the rate at which the aircraft is approaching the selected course. Therefore, the heading error signal may be used for damping to adequately control the navigation-localizer mode of operation. This invention provides a course-cut limiter, an on-course sensor, and a beam analyzer amplifier circuit of novel construction. Also included in this invention is a novel cross-wind correction means.

When an automatic pilot system incorporating this invention is flying in the navigation-localizer mode, the course deviation signals from the omnirange radio receiver are fed through the radio amplifier and the course-cut limiter to a network including the on-course sensor.

The course-cut limiter is a radio deviation signal limiter and is herein so named because the circuit limits the maximum angle of approach to a radio course that the system ultimately commands to a predetermined angle of, for example, 75°. When the radio deviation signal exceeds this predetermined level, the course-cut limiter operates in the manner of a voltage regulator tube to reduce the radio deviation signal to one which will command not more than a seventy-five degree "cut" at the selected course. The bank command signal for flight control is derived from this radio signal combining with a heading error signal. When the pilot selects the navigation-localizer mode and the radio receiver is tuned to the variable omnirange radio signal, the VOR radio signal mixed with the heading error signal gives the horizontal guidance or bank command signal. When the on-course sensor has determined that the radio signal and the bank command signal indicate that the aircraft is on-course, the on-course relay operates and remains operated until the pilot selects a different mode of operation.

The beam analyzer amplifier of the invention cuts out the variable omnirange radio signals when the aircraft is directly over the radio station in what is sometimes referred to as the cone of confusion. The on-course sensor automatically controls the position of a switching means so that once the aircraft is on-course, the on-course sensor will remain in the "on" position until the selected mode of the function selector is changed.

It is an object of this invention to provide an extremely accurate horizontal and lateral control in an aircraft guidance system. A further object of this invention is to provide an accurate horizontal and lateral control system wherein extremely large input command signals do not affect the system's accuracy. A still further object of this invention is to provide a horizontal and lateral control guidance system with an accurate and novel cross-wind correction means. It is another object of this invention to provide a horizontal and lateral control system wherein on-course flight once accomplished is maintained until the function selector switch is switched to a new mode of operation.

These and other objects of this invention will become more apparent when read in conjunction with the accompanying drawings, in which:

FIGURE 1 is a block diagram of the invention; and

Figure 2:
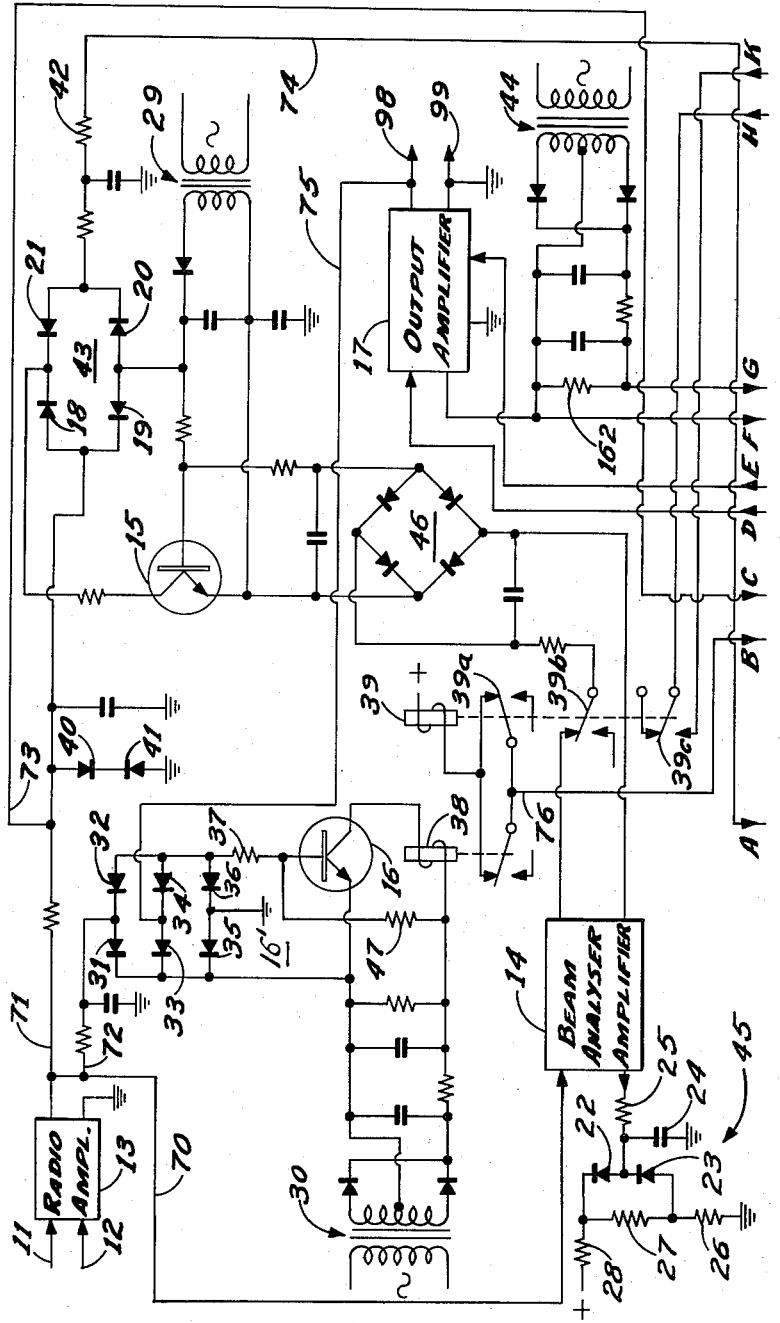

FIGURES 2 and 3 comprise a schematic diagram of one embodiment of this invention.

The present invention is embodied in certain operations upon signals from navigation radio and heading error information which are ultimately mixed and combined to form a bank command signal for horizontal guidance circuitry in a flight control system. With reference to the block diagram of FIGURE 1, output amplifier 17 is seen to obtain an input from a mixer 123 to supply an output signal 98—99 which is a composite signal made up of radio course deviation signals and heading error signals. The combination of radio deviation and heading error signals is a well-known expedient in flight control systems whereby the composite signal is utilized in providing a damped error signal to effect horizontal guidance. As shown in FIGURE 1, the horizontal guidance system into which the present invention is embodied is seen to be composed of three individual input signals to a mixer 123, the output of which is provided to the output amplifier 17. Inputs to this horizontal guidance system are taken from a radio amplifier 13 and a heading error source 101. The present invention then serves to combine these two signals while performing certain analyses and operations upon the signals such that at all times and under varying flight conditions the composite signal developed in the mixer 123 is extremely reliable.

With reference to FIGURE 1, inputs 11 and 12 to the radio amplifier 13 might be derived from location with respect to a variable omnirange radio beam by any well-known type of navigation receiver. This radio signal represents a deviation from a selected radio defined course and is applied through a course-cut limiter 40, 41 through beam analyzer switch cricuitry 15, 43 and thence through connector 74 as one input to mixer 123. The beam analyzer switch circuitry 15, 43, as will be later described, consists essentially of an electronic switch which is opened should the radio signal be varying rapidly as when the aircraft might be in the cone of confusion over the sending station or when the radio signal exceeds a predetermined value. The beam analyzer switch circuitry is under the control of a signal developed in a beam analyzer amplifier 14 as selectively applied through an on-course relay 38, 39, which relay is selectively positioned in accordance with the output from an on-course sensor circuit 16'. As illustrated in FIGURE 1, the on-course sensor 16' and the beam analyzer amplifier 14 each receive the output from the radio amplifier 13 and each performs an analysis operation upon the radio signal to ultimately determine whether beam analyzer switch circuit 15, 43 allows the radio signal to pass to mixer 123 or to cut out the radio signal to mixer 123 in accordance with the condition of the radio amplifier signal under various flight conditions. Basically, the on-course sensor 16' compares the radio amplifier 13 output signal with the output 98 from output amplifier 17 and energizes the on-course relay 38, 39 when the radio signal falls below a predetermined value and/or the heading error signal is less than a predetermined number of degrees. This condition defines an "on-course" flight condition and readies the on-course relay 38, 39 such that the beam analyzer amplifier 14 is connected to the beam analyzer switch circuitry 15, 43. The beam analyzer amplifier 14, as will be later described in detail, develops a signal to open the beam analyzer switch circuitry 15, 43 should the radio signal input to beam analyzer amplifier 14 be varying rapidly or is in excess of a predetermined value. It is thus seen that only during an on-course condition, wherein on-course relay 38, 39 is closed, the electronic switch of beam analyzer switch circuitry 15, 43 may be opened by the beam analyzer amplifier 14 should the radio signal be erratic in nature as over the cone of confusion and the radio signal accordingly be unreliable. Should the aircraft be some distance from the radio-defined beam and its output accordingly be extremely large, the on-course relay 38, 39 is opened and the beam analyzer switch circuitry 15, 43 remains in a state whereby its electronic switch is closed such that the radio is continuously applied through conductor 74 to mixer 123 and is not under control of the beam analyzer amplifier 14.

The remaining inputs to mixer 123 are those developed from a source of heading error signal. As illustrated in FIGURE 1, inputs from a course selector 120 and a compass 121 are applied to a heading error development circuit 101 and the output from the heading error development circuit is applied to a phase detector 106 to develop an output signal indicative of the error between the selected course as set into the flight control system by course selector 120 and the actual heading of the aircraft as supplied from the compass 121. The output from phase detector 106 is thus indicative of heading error and this heading error signal is in essence the second source of signals applied to mixer 123, output amplifier 17 and ultimately to the horizontal control circuitry of the aircraft. As illustrated in FIGURE 1, the heading error signal from phase detector 106 is applied to mixer 123 through two different channels. In the first instance, and at all times, the signal is applied through a command filter 118 to mixer 123. The error signal from phase detector 106 is also under certain conditions applied through a rate amplifier and low-pass filter 105 to the mixer 123. This latter channel is activated only when on-course relay 38, 39 is energized as during an on-course conditon. The on-course relay 38, 39 as will be later described, effectively shorts out the rate amplifier 105 through its cooperation with time constant changer circuitry 119, which is associated with rate amplifier 105. During such conditions that the rate amplifier 105 is effectively in the circuit, the mixing of outputs from command filter 118 and rate amplifier 105 effects an automatic cross-wind correction which, as will be further described, enables the aircraft to assume the crab angle necessary to eliminate the effect of cross wind. The signal resulting from mixing the heading signals from command filter 118 and rate amplifier 105 contains no steady state component of heading; thus, the aircraft is allowed to assume the correct crab angle to center on the radio course.

The manner in which the various operations on the radio and heading signals are realized will become apparent with reference to the schematic diagram of FIGURES 2 and 3 wherein like elements in FIGURE 1 are similarly referenced.

With reference then to FIGURES 2 and 3, the circuitry corresponding to the functional blocks of FIGURE 1 will first be identified. Radio amplifier 13 is seen to be supplied with inputs 11 and 12, which as previously discussed, might be from a navigation omnirange radio. The signal applied to radio amplifier 13 is thus indicative of a deviation from a selected radio course. Output from amplifier 13 is taken from connector 71 through a diode switching element generally designated as 43 and thence through resistor 42 and conductor 74 to a terminal in FIGURE 3 designated as 123, which is effectively the mixer 123 of FIGURE 1. The radio signal is developed across resistor 114 taken from terminal 123 to ground. This last described path then defines the radio input to the mixer 123. The course-cut limiter 40, 41 of FIGURE 1 is seen to be a pair of oppositely polarized zener diodes 40 and 41 serially connected between the output 71 of radio amplifier 13 and ground.

As previously described, the output from radio amplifier 13 through conductor 71 and the course-cut limiter 40, 41 is applied to mixer 123 only when the diode switch 43 is "closed." This diode switch circuit is conjointly controlled through the operation of the on-course sensor 16' and the beam analyzer amplifier 14. With reference to FIGURE 1, the input to beam analyzer amplifier 14 is seen to be the radio amplifier output signal applied through conductor 70. Beam analyzer amplifier 14 might be, for example, a magnetic amplifier having an input control winding to which the radio signal from conductor 70 is applied and wherein the control winding is completed through a combination rate and amplitude sensing circuit, generally designated by reference numeral 45, to ground. The circuitry of the rate and amplitude sensing circuit 45 is such that a return path to ground for the radio deviation signal from conductor 70 is provided only if the radio signal is varying rapidly or is greater than a predetermined amplitude. Beam analyzer amplifier 14 therefore develops an output only when the radio signal is varying rapidly or is greater than a predetermined value. The amplitude sensing circuits of the beam analyzer amplifier 14 include diodes 22 and 23, capacitive element 24, and resistive elements 25, 26, 27 and 28. One side of resistive element 28 is connected to a positive direct current voltage source. With no radio error signal input to the amplifier 14, diodes 22 and 23 are biased off and they so remain until the radio error signal input from conductor 70 reaches a predetermined value. When this predetermined value is reached, one or the other of diodes 22 or 23 conducts to provide the return path to ground, the particular diode conducting being dependent upon the polarity of the radio deviation signal. It is to be understood that the output from radio amplifier 13 is of one polarity or the other depending upon whether the aircraft is left or right of the predetermined radio course. Further, should the radio signal vary rapidly, capacitive element 24 shunts the radio signal directly to ground.

The output from beam analyzer amplifier 14 is applied through contacts of relay 39 to a bias developing bridge network 46 which forms a part of the beam analyzer switch circuitry 15, 43 of FIGURE 1. Assuming for the present that the contacts of relay 39 are closed as illustrated, the beam analyzer amplifier output is applied to the diode bridge arrangement 46 which provides a biasing arrangement between the emitter and base of the transistor 15. Transistor 15 is a part of the beam analyzer switch circuitry 15, 43 previously discussed and has a fixed bias voltage applied between its base and emitter from a direct current power source consisting of capacitance and unilateral conduction devices in conjunction with a transformer 29. When only this fixed bias is present for transistor 15, the transistor is biased into a conductive state such that a switching current flows through both legs of the diode switching network 43 and the diodes then do not impede the flow of radio output signal from conductor 71 through the network 43 to conductor 74 and thence to mixer 123. The application of an output signal from beam analyzer amplifier 14 to the diode bridge circuit 46 between the emitter and base of transistor 15 develops an additional bias in the reverse direction which is sufficient to overcome the fixd forward bias on transistor 15 and to render transistor 15 nonconductive. This removes the switching current through the diode switching network 43 and thus effectively closes this electronic switch and does not permit radio deviation signals to pass through conductor 74 to the mixer 123.

The application of the output from beam analyzer amplifier 14 to the beam analyzer switch circuitry discussed above occurs only when the on-course relay 39 is operated to complete the circuitry. On-course relay 39 is energized by on-course sensor circuitry which, as previously discussed, analyzes the radio signal and closes on-course relay 39 when the radio signal falls beneath a predetermined value and the bank command heading signal is less than a predetermined number of degrees, corresponding to an on-course or nearly on-course flight condition. The on-course sensor consists of a transistor-operated relay control circuit, whose controlling bias is determined from a comparison of the radio deviation signal and the output signal from output amplifier 17 which last signal includes the bank command heading component. Transistor 16 of the on-course sensor circuitry is fixed biased between the emitter and base by means of a direct current power supply energized from a transformer 30. Transistor 16 is normally biased to a conductive state through this fixed bias from transformer 30, the fixed bias being a positive voltage applied between the base and emitter as generated across resistor 47. The variable bias for transistor 16 is produced by a radio amplifier output signal taken through conductor 72 and a diode network consisting of diodes 31, 32, 33, 34, 35 and 36 and from the radio deviation and bank command signal from output amplifier 17 through conductor 75 to the diode network. The power supply 30 places a positive bias on the base of transistor 16 while the radio deviation and bank command signals place a variable negative signal on the base of the transistor across resistor 37. This negative bias increases in proportion to the amplifier 17 output. When the radio and bank command signals exceed a predetermined value, the negative signal on the base of transistor 16 overrides the positive bias and cuts off the transistor. The winding on relay 38 is included in the collector circuit of transistor 16. Thus when transistor 16 conducts, the relay 38 is actuated and the relay contacts are positioned, as shown in FIGURE 2. When relay 38 is energized, contacts close which complete the ground circuit for the control winding of relay 39 through conductor 76 to a section 103 of a mode selector switch 115 (FIGURE 3). Upon energization of relay 39, contacts 39a form a holding circuit to maintain ground potential on one side of relay 39 and thus hold relay 39 energized until such a time as the mode selector switch 115 is changed in position such as to interrupt the ground momentarily. The function of this mode switch will be further described in more detail. The output signals from beam analyzer amplifier 14 are completed through contact 39b of relay 39 to the beam analyzer switch bias circuitry 46, as previously discussed. As will be further described, a third set of contacts 39c on relay 39 provides a shorting function for the heading rate amplifier circuitry such that the rate amplifier 105 is rendered inoperative during off-course conditions.

The above discussion has centered about the various operations performed on the radio deviation signal by the circuitry of this invention. It has been shown that the radio deviation signal from radio amplifier 13 is applied to mixer 123 only under certain conditions which ensure reliability. The on-course sensor circuitry 16', in addition to selectively applying the beam analyzer amplifier 14 output to the beam analyzer switch circuitry 15, 43, performs a switching operation upon the heading error development circuitry which will now be described. The inclusion of the heading error signal and its subsequent mixing with the radio deviation signal to provide a composite control voltage results in a command signal to the aircraft control surfaces, which is directly proportional to deviations from the selected course. In a flight control system where a radio deviation signal is an important part of the error signal, it is necessary to include damping signals and these damping signals must approximate the rate at which the aircraft is approaching the selected course. The heading error signal described herein is used to approximate the rate signal in determining deviation. As previously described, the heading error signal is developed from a comparison of a selected course from course selector 120 (see FIGURE 1) and compass information from a compass 121. These inputs are applied to comparison circuit 101 from which an error signal is applied to a phase detector 106 which includes the function of removing a possible 180° ambiguity from the heading error input thereto. The operation of phase detector 106 is conventional and its detailed operation is not pertinent to the present invention; it being sufficient to state that the output from the phase detector 106 consists of a direct current voltage indicative by polarity of a particular heading error existing between the selected course and the actual heading of the aircraft as derived from compass information. The output from the phase detector 106 is applied through a command filter 118, which essentially is composed of an integrating resistor-capacitor network. Command filter 118 shorts rapidly varying or transient error signals to ground. This is necessary since at the instant a new heading is selected, a heading error is introduced and the system changes very rapidly from zero error to some considerable amount of error. This transient is shorted to ground by the command filter 118 to prevent violent aircraft action in the event that the heading selector might be moved sharply. The heading signal after passing through the command filter 118 is applied through mixing resistors 110 and 114 to ground. Mixing junction 123 supplies the signal through contacts 122a and 117a of relays 122 and 117 respectively to the output amplifier 17.

The heading error signal from phase detector 106 is also applied through resistor 124 and conductor 78 to the input of rate amplifier 105. Rate amplifier 105 is utilized in the present invention to generate a rate signal used for cross-wind correction. The crab angle at which the aircraft must fly is the steady state component of the heading signal. When the steady state component of the heading signal is cancelled, the aircraft assumes under control of the aircraft guidance circuitry the crab angle necessary to eliminate the effects of the cross wind. Crab angle error signal in the present invention is cancelled by mixing to heading signals with the radio deviation signal. One heading signal, as discussed above, originates from phase detector 106 through the command filter 118. The other heading signal is generated in rate amplifier 105. Rate amplifier 105 includes a low-pass filter with a very long time constant which also provides reversal of the polarity of the input signal. The output signals from rate amplifier 105 are then passed through a mixing circuit including resistances 112, 113 and 114 to ground. The mixed heading output signals from this mixing circuit are applied from mixing junction 123 in conjunction with the radio deviation signals from the radio amplifier 13 to output amplifier 17.

The rate amplifier 105 might be, for example, a magnetic amplifier which contains a large capacitance in its feedback loop. This capacitance causes the amplifier to have a slow time response identical to a low-pass filter. The network consisting of capacitor 151 and resistors 152 and 153 connected from the output of the amplifier to ground have no effect on the circuit due to the low impedance characteristics of the amplifier. Their function will be further explained. A plurality of capacitors 107, 108 and 109 are associated with the rate amplifier 105 and are paralleled with a gain resistor 163 of the amplifier 105. Gain resistor 163 might be conventionally in series with a feedback winding of the amplifier 105; the over-all gain of amplifier 105 then varying as a direct function of the size of the gain resistor 163. These capacitors are connected to amplifier 105 through normally closed contacts 117c and 117d of a relay 117 and it is further noted that the capacitor bank 119 may be shorted through contacts 39c of the on-course relay 39. Should relay 39 be unenergized as during an off-course condition, the resulting short effectively reduces the gain of the rate amplifier 105 to zero, it being necessary that the cross wind correction circuitry be used only once the aircraft has attained the selected course as in an on-course condition. If the rate amplifier 105 were to operate before the aircraft had attained its selected course, the washout action would be premature and would cause excessive bracketing about the course. As will be further described, the capacitor bank 119 is removed from the rate amplifier circuitry 105 during other modes of operation as, for example, a localizer radio mode during which relay 117 is caused to be energized and thus change the time constant of the rate amplifier 105 in accordance with the differing flight conditions.

The horizontal guidance system of the present invention incorporates a mode selector switch to effect different combinations of signal being applied to the output amplifier, each tailored to be particularly adaptable for a given flight condition. With reference to FIGURE 3, the mode selector knob 115 positions switch sections 102, 103 and 104 in accordance with particular modes of operation.

Services performed in the illustrated NAV/LOC mode are dependent upon the frequency to which the radio receiver is tuned. These services might be referred to as functions which will hereinafter be defined as the NAV function when the radio is tuned to a VOR frequency and a localizer function when the radio is tuned to a localizer frequency. These functions are introduced by a relay 117 which, as illustrated, is energized when the radio is tuned to a localizer frequency and is correspondingly unenergized when the radio is tuned to a NAV frequency. This action is functionally represented as a simple switch, it being understood that in an actual embodiment the switching function of switch 116 would be incorporated as a portion of the radio frequency selecting means. Switch 116 is accordingly identified as having a NAV position and an APPR/LOC position, the latter position being so indicated since the radio is tuned to a localizer frequency under approach operating conditions.

For the NAV/LOC mode position of selector knob 115 and with switch 116 in the NAV function position as illustrated, switch section 102 applies heading error to phase detector 106, while switch section 103 completes the ground return for the control windings of relay 122 and on-course relay 39. Thus relay 122 is energized to combine heading rate with heading error to effect cross-wind correction as previously described, while on-course relay 39 is rendered operable to selectively apply radio information to mixer 123 at such times as the radio signal from radio amplifier 13 is reliable as previously discussed. Switch section 104 provides a ground return for relay 117 which is supplied with an energizing voltage when the navigation receiver is tuned to a localizer frequency. This is indicated functionally by the closing of switch 116 to supply 28 volts D.C. to relay 117. With the closing of relay 117, the following LOC function is effected: radio deviation from radio amplifier 13 is applied through conductor 73, resistor 140, and contact 117a of relay 117 to the output amplifier 17 and thus the radio signal bypasses the beam analyzer switch 43. Heading rate amplifier 105 is removed from the heading error circuitry by the grounding of input conductor 78 through relay contact 117b. Thus heading and radio signals are mixed and applied to output amplifier 17 when tuned to a localizer frequency in the NAV/LOC mode.

When the mode selector knob 115 is rotated clockwise 90° to the APPR. (approach) mode position, switch section 102 retains its function of applying heading error to phase detector 106. Switch section 103 removes the ground return for relay 122 and on-course relay 39, thus opening these relays. On-course relay 39 is opened such that upon subsequent return to the NAV/LOC mode, the radio signal from radio amplifier 13 will not be applied to mixer 123 unless it meets the previously described reliability conditions. Relay contact 122b of relay 122 completes a connection from the junction of resistors 152 and 153 at the output of rate amplifier 105 to contact 117a of relay 117, the purpose of which will be further explained. Switch section 104 continues to provide the ground for the winding of relay 117 and, as in the LOC function of the NAV/LOC mode, relay 117 is applied with an energizing voltage through switch 116 since the radio would be tuned to a localizer frequency for operation in the approach mode. The radio deviation signal from radio amplifier 13 thus continues to bypass beam analyzer switch 43 to conductor 73, resistor 140 and relay contact 117a and is applied to the output amplifier 17. Contacts 117c and 117d of relay 117 disconnect the large capacitance bank 119 which was part of the filtering section of rate amplifier 105 when operating in the NAV function of the NAV/LOC mode. Relay contact 117b grounds the heading input on conductor 78 to rate amplifier 105 and removes the ground from conductor 79. As previously described, rate amplifier 105 is of the magnetic amplifier type wherein conductors 78 and 79 would connect to opposite ends of the input control winding. Thus relay contact 117b grounds capacitor 79 to apply heading error input from conductor 78 in the open position of relay 117; and upon the closing of relay 117 and contact 117b the ground connection is reversed—that is, conductor 78 is grounded. This action is then seen to apply a different input to rate amplifier 105 from the junction of resistors 154, 155 and 156 through the control winding of rate amplifier 105, conductor 78, and through relay contact 117b to ground to complete the input. This latter connection in the approach mode effects the development of a synthetic rate signal whereby rate amplifier 105 is utilized as a filtering function, but in a different manner than that in the previously described NAV/LOC mode function. This signal is produced by applying radio deviation, heading error, and bank signal through resistors 154, 155 and 156 respectively to the rate amplifier. The rate amplifier in conjunction with the high-pass filter section of capacitor 151 and resistors 152 and 153 then functions as a complementary filter. Rate amplifier 105 acts as the low-pass filter section which works into the high-pass filter section at the output thereof. Each section of this complementary filter has a two-second time constant and the complete filter has a resonant frequency of 0.08 c.p.s. At rates of frequency change below 0.08 c.p.s., the output of the filter is primarily the rate of change of radio deviation, produced by the section of the high-pass filter section on the radio deviation (differentiation of the signal). At rates about 0.08 c.p.s. the output of the filter is predominately heading. At frequencies above 0.08 c.p.s. the output of the filter is predominately the bank signal, which by action of the low-pass filter of rate amplifier 105 has been integrated. The summation of differentiated radio, heading, and integrated bank out of the filter is a signal which approximates the rate at which the aircraft is approaching the selected course. The ratio of radio deviation heading error and bank signals required to produce the synthetic rate signal is established by the size of input resistors 154, 155 and 156 respectively. Since the output of the complementary filter is a rate signal, standoff from the localizer course to a cross wind is corrected automatically. Any steady-state heading signal is washed out in the complementary filter. Therefore, the signal caused by crab angle is washed out and is not mixed with the radio deviation signal. The low-pass filter capacitors in this consideration are indicated by capacitor 150 which, as previously described, is paralleled with the gain resistor in rate amplifier 105. Contacts 117c and 117d of relay 117 remove the large capacitance bank 119 which was part of the filter in the NAV function. The high-pass filter of the complementary filter consists of capacitor 151, and resistors 152 and 153 at the output of rate amplifier 105. Synthetic rate signal output is obtained at the junction of resistors 152 and 153 and applied to relay contact 122b of relay 122. As previously described, upon changing to APPR. (approach) mode, relay 122 is de-energized and thus a synthetic signal from the junctions of resistors 152 and 153 is applied through relay contact 122b and mixed with the radio deviation signal from conductor 73 and applied through contact 117a of relay 117 (energized) to output amplifier 17. Thus in approach mode of the horizontal guidance system of this invention, radio is seen to be combined independent of the beam analyzer switch circuitry to the output amplifier 17 and is mixed with a synthetic rate signal through a complementary filter uniquely incorporating rate amplifier 105 and developing a signal from radio heading and bank combined to ultimately effect an output control signal from output amplifier 17.

The guidance signal development further includes the provision for bank limiting and for varying the bank limit for particular flight functions as set in by selector switch 115. With reference to FIGURE 3, switch section 103 is seen to complete a ground for relay 123 when positioned in the approach mode. Relay 123 through contacts 123a selectively inserts combinations of two variable bias resistors 160 and 161 into a controlling effect as regards output amplifier 117. The junction of resistor 160 and 161 is connected through conductor 80 to the output amplifier 17. Conductors 81 and 82 are seen to be connected across the load resistor of a full wave rectifier bias power supply energized from transformer 44 (FIGURE 2). Relay contacts 123a are thus seen to selectively shunt power supply resistor 162 with varying combinations of resistance and thus apply a preselected bias voltage through conductor 80 to output amplifier 17. Output amplifier 17 would then include a clamping diode to which the preselected bias is applied so as to selectively limit the output signal to a predetermined value in accordance with the operated mode as determined by junction selector switch 103 and the settings of limiting resistors 160 and 161.

The present invention is thus seen to provide means for combining radio deviation signals and heading error for the development of a bank control signal in the horizontal guidance of an aircraft. It is further seen that various operations are performed on the radio signal such that during certain modes and under conditions of reliability, it is included in the output signal development. The system is further seen to provide operations upon the heading signal to effect cross-wind correction and to ultimately effect combinations of radio deviation and heading such as to ensure smooth and reliable aircraft control under varying flight conditions.

Although this invention has been described with respect to a particular embodiment thereof, it is not to be so limited as changes and modifications may be made therein which are within the full intended scope of the invention as defined by the appended claims.

We claim:

1. In a horizontal control signal development system for aircraft guidance of the type including heading error and radio-course deviation input signals, means for selectively effecting cross-wind compensation comprising mixing means, an output signal amplifier, the output of said mixing means applied to said output signal amplifier, function selector means, said heading error signal and said radio deviation signal applied to said mixing means, low-pass filtering means including means for signal polarity reversal therein, said heading error signal applied to said low-pass filtering means, said function selector means connected to said low pass filter means and selectively permitting passage of said heading error signal therethrough, and the output of said low-pass filtering means connected to said mixing means, whereby the steady state component of said heading error signal may be selectively cancelled.

2. In a horizontal control signal development system for aircraft guidance of the type including heading error and radio-course deviation input signals, means for effecting cross-wind compensation comprising mixing means, an output signal amplifier, the output of said mixing means being applied to said output signal amplifier, function selector means, said heading error signal and said radio deviation signal being applied to said mixing means, low-pass filtering means including means for signal polarity reversal therein, said heading error signal being applied to said low-pass filtering means, the output of said low pass filtering means connected to said mixing means, switching means, control means for said switching means, said radio deviation signal being applied to said switch control means, said switch control means producing an output signal when said radio signal falls beneath a predetermined magnitude, said function selector means connected to said switching means and selectively rendering said switching means operable in the presence of an output signal from said switch control means, said switching means connected to said low-pass filtering means and blocking the passage of said heading error signal therethrough in the absence of an output signal from said switch control means, whereby the output from said low-pass filtering means is selectively applied to said mixing means to effect a cancellation of the steady state component of said heading signal.

3. In a horizontal control signal development system for aircraft guidance of the type utilizing heading error and radio deviation input signals, and mixing means for said radio and heading signals; means for selectively combining said radio and heading error signals comprising first signal translating means, second signal translating means, first switching means, said radio course deviation signal being connected through said first switching means to said signal mixing means, said heading error signal being applied to said mixing means, low-pass filtering means, said heading error signal additionally selectively being applied through said low-pass filtering means to said mixing means, an output signal amplifier, the output from said mixing means being applied to said output signal amplifier, said first signal translating means receiving said radio deviation signal and the output from said output signal amplifier and adapted to produce an output signal when said radio signal falls beneath a predetermined magnitude and further producing an output signal when said heading error signal falls below a predetermined magnitude, second switching means, the output from said first signal translating means connected to said second switching means, said second signal translating means receiving said radio signal and being adapted to produce an output signal when said radio signal varies erratically and when said radio signal exceeds a predetermined magnitude, the output from said second signal translating means being operably connected through said second switching means to said first switching means, said second switching means being connected to said low-pass filtering means and upon being unenergized blocking the flow of said heading error signal through said low pass filtering means whereby said radio deviation signal and said heading error signal are selectively mixed in accordance with predetermined characteristics thereof.

4. A signal development system as defined in claim 3 wherein said first signal translating means comprises a normally conductive transistor-operated switch control circuit for said second switching means, bias controlling means operably connected with said switch control circuit and adapted to develop reverse bias in proportion to the outputs from said output signal amplifier and said radio deviation signal, whereby said switch control circuit is operably controlled in accordance with predetermined magnitudes of said radio deviation signal and the output from said output signal amplifier.

5. A signal development system as defined in claim 4 further comprising a multiposition function selector switch, said switch control circuit comprising a first relay operable in accordance with said transistor output current, a second relay connected to an energizing voltage source and serially through contacts of said first relay and said function selector switch to a ground return for said energizing voltage source, first contacts of said second relay holding said second relay closed upon initial activation thereof, said second relay including a second set of contacts to connect the output of said second signal translating means to said first switching means and a third set of contacts to effect disabling of said low-pass filtering means, whereby said second relay once energized remains so independent of said first signal translating means until said function selector switch is moved in position.

6. A signal development system as defined in claim 3 wherein said first switching means comprises a normally conducting transistor with fixed biasing means, a fullwave diode bridge network having first and second pairs of terminals with a first pair of terminals thereof connected between the collector and base elements of said transistor, said radio signal being applied serially through a second pair of said terminals to said output signal amplifier, variable bias developing means, said second signal translating means output connected through said second switching means to said variable bias developing means, said last means applying a bias opposite to that of said fixed biasing means to said transistor upon receiving an output from said second signal translating means whereby said transistor is rendered nonconductive and said radio signal is blocked by said diode bridge network in the absence of switching current therethrough.

7. A signal development system as defined in claim 3 further comprising radio signal rate and amplitude sensing means serially connected with input means of said second signal translating means, said radio signal being applied across said aforedefined series connection, said rate and amplitude sensing means being adapted to pass said radio deviation signal through said input means when said radio signal varies erratically and to further pass said deviation signal through said input means when said radio signal exceeds a predetermined amplitude.

8. A signal development system as defined in claim 7 wherein said amplitude sensing means comprises a plurality of unilateral conduction devices with fixed biasing means operably connected to said unilateral conduction devices so as to render them nonconductive, a predetermined magnitude of said radio deviation signal effecting conduction of a certain one of said unilateral conduction devices to permit passage of said radio deviation signal.

9. A signal development system as defined in claim 7 wherein said rate sensing means comprises a capacitive element shunting said amplitude sensing means, whereby radio deviation signals having a rate of change in excess of a predetermined magnitude are passed through the input circuit of said second signal translating means.

10. A signal development system as defined in claim 3 further comprising multiposition function selector switching means, said radio deviation signal being selectively applied through said function selector switching means to said output amplifier, the output of said mixing means being selectively connectable through said function selector switching means to said output amplifier, time constant altering means selectively connectable through said function selector switching means to said low pass filter means, synthetic heading signal developing means selectively connectable to the input of said low pass filtering means through said function selector switching means; said synthetic heading signal developing means comprising, means for developing a signal indicative of the bank attitude of said aircraft, means for mixing said bank indicative signal with said heading error and radio deviation signals to form a synthetic heading signal; said function selector switching means selectively effecting application of said heading error signal to said low pass filtering means, high pass filtering means connected to the output of said low pass filtering means and to said function selector switching means, the output of said high pass filtering means being selectively connectable through said function selector switching means to said output amplifier; said function selector switching means being adapted in a first position thereof to effect application of said heading error signal to said low pass filtering means and the output from said mixing means to said output amplifier; said function selector switching means being adapted in a second position thereof to remove said aforedefined first position connections and signal application and effect application of said synthetic heading signal to said low pass filtering means and connect the output of said high pass filtering means to said output amplifier and apply said radio deviation signal to said output amplifier while further disconnecting said time constant altering means from said low pass filtering means.

11. In a horizontal control signal development system for aircraft guidance of the type including heading error and radio course deviation input signals and including means for developing a signal indicative of the bank attitude of said aircraft; means for selectively combining said signals comprising; multiposition function selector switching means, signal mixing means, said heading error signal and radio deviation signal applied to said mixing means, an output amplifier, said radio deviation signal being selectively applied through said function selector switching means to said output amplifier, low pass filtering means, the output from said low pass filter means connected to said mixing means, the output of said mixing means being selectively connected through said function selector switching means to said output amplifier, time constant altering means selectively connectable through said function selector switching means to said low pass filter means, synthetic heading signal developing means selectively connectable to the input of said low pass filtering means through said function selector switching means; said synthetic heading signal developing means comprising, means for mixing said bank indicative signal with said heading error and radio deviation signals to form a synthetic heading signal; said function selector switching means selectively effecting application of said heading error signal to said low pass filtering means, high pass filtering means connected to the output of said low pass filtering means and to said function selector switching means, the output of said high pass filtering means being selectively connectable through said function selector switching means to said output amplifier; said function selector switching means being adapted in a first position thereof to effect application of said heading error signal to said low pass filtering means and the output from said mixing means to said output amplifier; said function selector switching means being adapted in a second position thereof to remove said aforedefined first position connections and signal applications and effect application of said synthetic heading signal to said low pass filtering means and connect the output of said high pass filtering means to said output amplifier and apply said radio deviation signal to said output amplifier while further disconnecting said time constant altering means from said low pass filtering means.

References Cited in the file of this patent

UNITED STATES PATENTS

| | | |
|---|---|---|
| 2,592,173 | Noxon | Apr. 8, 1952 |
| 2,613,350 | Kellogg | Oct. 7, 1952 |
| 2,613,352 | Kellogg | Oct. 7, 1952 |
| 2,776,428 | Hassler | Jan. 1, 1957 |
| 2,845,623 | Iddings | July 29, 1958 |
| 2,881,992 | Hecht et al. | Apr. 14, 1959 |